Nov. 15, 1927.  1,649,742
S. RUBEN
ELECTRIC CURRENT RECTIFIER
Filed Nov. 18, 1924
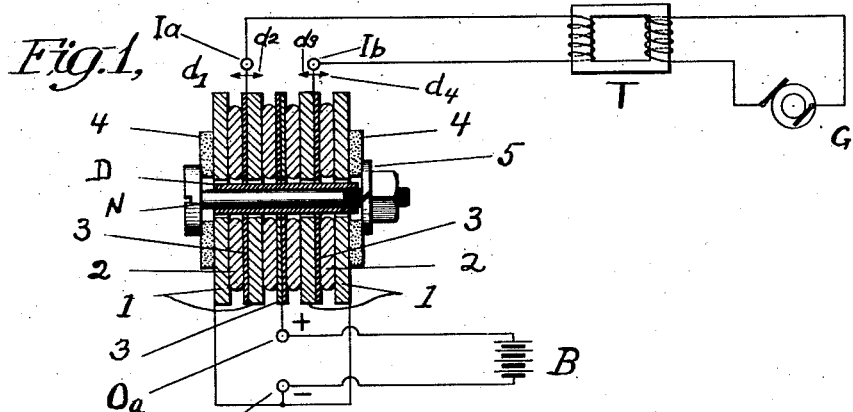
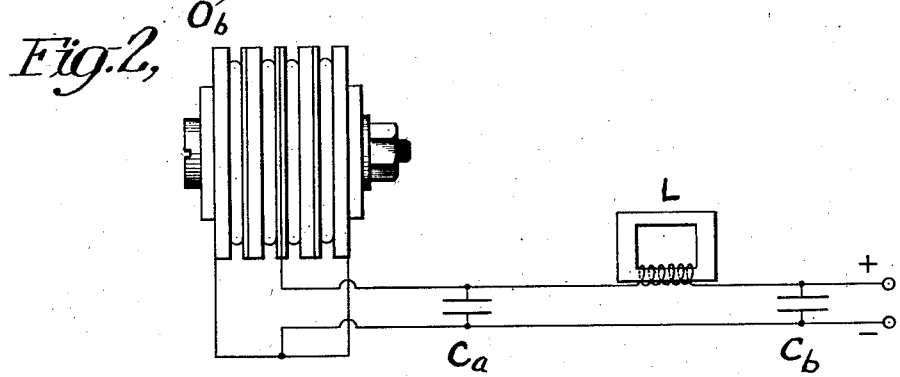
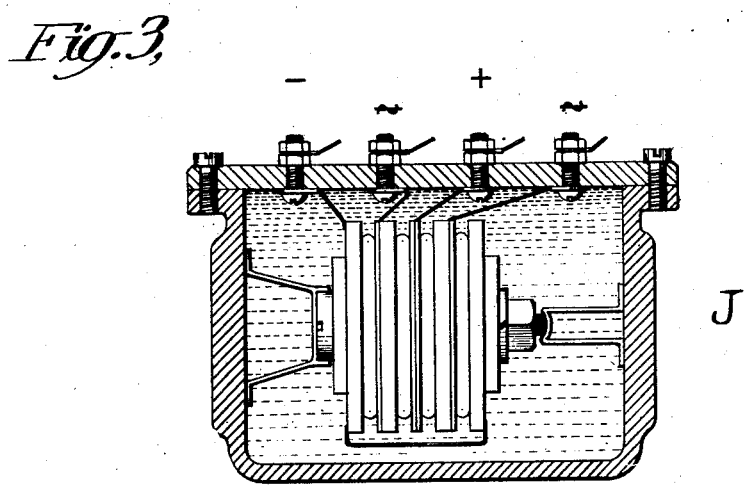
Inventor
Samuel Ruben
By his Attorney Patented Nov. 15, 1927.

1,649,742

UNITED STATES PATENT OFFICE.

SAMUEL RUBEN, OF NEW YORK, N. Y., ASSIGNOR, BY MESNE ASSIGNMENTS, TO RUBEN RECTIFIER CORPORATION OF DELAWARE.

ELECTRIC-CURRENT RECTIFIER.

Application filed November 18, 1924. Serial No. 750,539.

This invention relates to electric current rectifiers and the like, and particularly to electrode elements which are adapted to provide an asymmetric couple of the dry surface-contact variety.

The object generally of the invention is to provide a device of this character which is economical, efficient and readily manufactured.

More specifically an object of the invention is to provide a construction and arrangement of electrode elements which will be very durable and not liable to disintegration from the passage of the current rectified, even for currents of relatively high densities.

Other objects of the invention will in part be obvious and will in part appear hereinafter.

The invention accordingly comprises the features of construction, combinations of elements, and arrangement of parts, which will be exemplified in the constructions hereinafter set forth and the scope of the application of which will be indicated in the claims.

The present application is a continuation in part of my prior application, Serial No. 739,188, filed September 22, 1924.

For a fuller understanding of the nature and objects of the invention reference should be had to the following detailed description taken in connection with the accompanying drawing, in which:

Figure 1 shows a rectifying device, in section, connected in a battery-charging circuit;

Fig. 2 is a diagrammatic view showing the rectifying device connected in a filter circuit; and Fig. 3 shows a rectifying device immersed in an oil bath.

Electrode elements for asymmetric couples, rectifying units and the like, according to the present improvements, are made respectively of electropositive and electronegative materials which are relatively divergent in the electrochemical series; a relatively highly electropositive metal, or compound, for example, aluminum amalgam, is adapted to serve as material for the positive electrode, while the electronegative material such as a film-forming metalloid, for example, cupric sulphide, is adapted to serve as the negative electrode. In order that such electrodes when in operation shall not readily disintegrate by reason of uneven current densities over the contacting surfaces, these electrode elements are made to be dense, smooth, even, and mechanically durable. By the terms of this invention, the construction and connections make it impossible for the battery or other element, such, for example, as a condenser filter circuit, receiving the charge through this rectifying device, to discharge that element should the alternating current supply be interrupted or lowered in potential, differing in this respect from the rectifying devices of the prior art.

I have found that an aluminum plate left in a bath of a saturated mercuric chloride solution until the reaction therebetween has produced an amalgam of mercury and aluminum, forms a very efficient current rectification element when in close surface contact with a cupric sulphide element, which is capable of withstanding heavy electrical overloads and has an increased capacity over that of the surface combination of aluminum sulphide and cupric sulphide, as described in the application referred to. This is due to the fact that in the newer combination the amalgam formed is not merely a surface coating, but one which extends well into or through the body of the aluminum element, and that the surface contact resistance between the aluminum amalgam and the cupric sulphide element is lower than the surface resistance between the aluminum sulphide and the cupric sulphide bodies.

Further, rectification units composed of aluminum amalgam and cupric sulphide are capable of withstanding much higher temperatures without oxidation effects. However, for the more complete protecton against the action of excess temperatures and moisture, the exposed unit surfaces are covered with a protecting material, such as a cellulose compound, or are immersed in a suitable insulating material, such, for instance as oil, the latter means of protection being especially important where high curent densities are applied over sustained periods.

By this combination, rectification is effected by unilateral conduction action probably due to, the electronic reaction between the highly electro-positive electrode, that is, the aluminum amalgam, and the highly electrode-negative cupric sulphide electrode. Thus, in an electric circuit when the aluminum amalgam electrode is positively charged, no current flows through the circuit, including the aluminum amalgam and cupric sulphide couple; but when it is negatively charged the current flows, and little resistance is offered.

A rectifier of this construction requires no preliminary sparking or extended formation period, as is necessary in rectifiers of the dry electrolysis type of the prior art, requiring reaction between the dissimilar materials for the production of the rectifying film, as, for example, an aluminum electrode in surface contact with a cuprous sulphide electrode, in which the rectifying film is unstable, decomposing in a short time after the discontinuance of the discharge current.

While aluminum alone, as one of the rectifying elements, constitutes a suitable electropositive material, it is unstable, in that, by the discharge of current through it, it produces a rectifying film or cell operable over only short periods and requires heavy formation currents to produce a film upon its surface for even temporary rectification by the process of dry electrolysis. By the amalgamation of the aluminum I have produced an electrode which is highly reactive to the electro-negative electrodes.

If the rectifier devices of my invention are to be operated at potentials higher than is practicable to apply to a single device, the electrical field stresses upon the rectifying surfaces are relieved, and safer and more efficient operation results by applying the entire potential, instead of over one, over a plurality of the devices so connected that their output terminals are in series and their input potentials are from independent sources and are the sum total of the maximum input potential. This is accomplished by the employment of a transformer having a separate secondary for each separate rectifier unit, to which it is connected.

Referring to the drawing, and first to Fig. 1, 1 represents a series of conducting plates, 2 a series of interposed electronegative electrodes, for example, cupric sulphide elements, and 3 a series of electropositive electrodes, for example, aluminum amalgam elements; such elements being arranged in pairs to form asymmetric couples. At $I_a$ and $I_b$ are alternating current input terminals, while at $O_a$ and $O_b$ are the output terminals. For full-wave rectification these couples are arranged in two groups of relatively inverted series, the intervening electrode adjacent elements 3 being adapted to be connected to the positive pole of a battery or other current-consuming device, shown at B, while the negative pole is connected to the outer end plates 1. Bolt N holds the electrodes in contact, it being insulated therefrom by an insulating tube D and end washers 4. By this arrangement it is substantially impossible for inverse current from the current-consuming device to pass through the rectifier. This feature increases the amount of current output, since decreasing the inverse current and consequently the heating losses permits continuous operation of the rectifier. T indicates a stepdown transformer adapted for voltage reduction to a potential suitable for battery charging, G denoting a suitable original source of alternating current supply. A spring washer 5 is preferably provided in the couple to insure substantially constant pressure adapted to compensate for temperature changes.

In operation, as the alternating current is applied to the electrodes, the current flows when the aluminum amalgam electrode is the cathode, in a direction indicated by arrows $d_1$ and $d_4$; upon a reversal of the polarity of the current, the current flows as indicated by arrows $d_2$ and $d_3$; thus allowing complete and efficient rectification, and the application of direct current to the output terminals $O_a$ and $O_b$. The battery receives a charge when the output direct current potential is greater than its own, the current flowing through the circuit. However, should this potential be reduced, the battery will not discharge in the opposite direction because of the practically open circuit resistance of the aluminum amalgam electrode when connected as an anode. This feature is also of great importance when a condenser filter circuit, as used in radio circuits, is being charged.

In Fig. 2, instead of a storage battery connected to the output terminals, a condenser filter circuit is so connected, especially designed for use in radio reception and transmission circuits. $C_a$ and $C_b$ are fixed condensers of 4 mfd. capacity and L is an inductance of 50 henrys.

In operation, the condenser filter circuit is charged in a manner similar to that operation indicated in Fig. 1, the inductance L, preventing a flow of the pulsating direct current; so that the available output potential from condenser $C_b$ will be steady and direct. By virtue of the inverse connections of the condenser with the rectifier, a condition exists similar to that of battery charging, the condenser being unable to discharge back into the rectifier circuit when the rectified potential is lower than the condenser potential, or when there are line interruptions.

In Fig. 3 J represents a container for the rectifier device in an oil bath to prevent decomposition by atmospheric thermal and moisture conditions, and to overcome any tendency of that device to become overheated.

The fluid dielectric material thus enveloping the asymmetric couples of the dry rectifier unit shown, co-operates in maintaining the inverse current blocking film which forms at the contacting surface of the electropositive and electronegative electrode elements, since it operates to exclude the atmosphere from entering the small crevices that may develop between the solid surfaces of the elements, thereby avoiding oxidation effects as noted above, and at the same time co-operates in maintaining a proper working temperature.

Since certain changes may be made in the above construction and different embodiments of the invention could be made without departing from the scope thereof, it is intended that all matter contained in the above description or shown in the accompanying drawing shall be interpreted as illustrative and not in a limiting sense.

Having described my invention, what I claim as new and desire to secure by Letters Patent is:—

1. In dry surface-contact rectifying devices and the like, an asymmetric electric couple comprising an electropositive electrode element composed of an amalgam of aluminum and an electronegative electrode element composed of an electrically-conducting metallic sulphide.

2. In dry surface-contact rectifying devices and the like, an asymmetric electric couple comprising an electropositive electrode element composed of an amalgam of aluminum and an electronegative electrode element composed of cupric sulphide.

3. In dry surface-contact rectifying devices and the like, an asymmetric electric couple comprising an electropositive electrode element of an amalgam of an electropositive metal and an electronegative electrode element composed of cupric sulphide.

4. In dry surface-contact rectifying devices and the like, an asymmetric electric couple comprising an electropositive electrode element composed of an amalgam of an electropositive metal, and an electronegative electrode element composed of an electrically-conducting metallic sulphide; said couple having a surface covering made from fluid dielectric material.

5. In dry surface-contact rectifying devices and the like, an asymmetric electric couple comprising an electropositive electrode element composed of an amalgam of aluminum and an electronegative electrode element composed of cupric sulphide; said couple having a surface covering composed of a soluble cellulose compound.

6. In dry surface-contact rectifying devices and the like, an asymmetric couple comprising an electropositive electrode element of electropositive metal and an electronegative electrode element composed of a metallic compound of an electronegative chemical element having a solid surface and adapted for the electrochemical formation in conjunction with said electropositive electrode element of an inverse current-blocking film; said couple having a solid surface covering made from fluid dielectric material adapted to co-operate in the preservation of said film.

7. In dry surface-contact rectifying devices and the like, an asymmetric electric couple comprising an electropositive electrode element of highly electropositive metallic material and an electronegative electrode element comprising cupric sulphide having a surface covering made from a soluble cellulose compound.

8. In dry surface-contact rectifying devices and the like, an asymmetric electric couple comprising an electropositive electrode element of highly electropositive metallic material and an electronegative electrode element comprising cupric sulphide and a closed container about said couple and containing a surface covering for said couple made from fluid dielectric material.

Signed at New York in the county of New York and State of New York this 17th day of November, A. D. 1924.

SAMUEL RUBEN.